US007100869B2

(12) United States Patent
Picard et al.

(10) Patent No.: US 7,100,869 B2
(45) Date of Patent: Sep. 5, 2006

(54) TURBOPROP CARRIER STRUCTURE AND AN ASSEMBLY INCLUDING SUCH A CARRIER STRUCTURE

(75) Inventors: Jean-Louis Picard, Vaux le Penil (FR); Georges Mazeaud, Yerres (FR)

(73) Assignee: SNECMA Moteurs, Paris (FR)

( * ) Notice: Subject to any disclaimer, the term of this patent is extended or adjusted under 35 U.S.C. 154(b) by 341 days.

(21) Appl. No.: 10/780,639

(22) Filed: Feb. 19, 2004

(65) Prior Publication Data

US 2004/0227033 A1 Nov. 18, 2004

(30) Foreign Application Priority Data

Feb. 19, 2003 (FR) .................................. 03 02000

(51) Int. Cl.
*B64D 27/26* (2006.01)
(52) U.S. Cl. ...................... 244/54; 244/53 R; 248/554
(58) Field of Classification Search .............. 244/53 R, 244/53 B, 1 N, 54; 239/265.19, 265.25; 137/15.1; 60/797, 796, 909, 226.1; 248/554
See application file for complete search history.

(56) References Cited

U.S. PATENT DOCUMENTS 2,944,766 A * 7/1960 Varhanik et al. .............. 244/54
2,958,480 A * 11/1960 Saulnier ....................... 244/15
4,266,741 A 5/1981 Murphy
5,205,513 A * 4/1993 Schilling ..................... 244/54
5,603,471 A * 2/1997 Armstrong ................ 244/53 R
6,290,173 B1 * 9/2001 Nickels ..................... 244/53 R

FOREIGN PATENT DOCUMENTS

| DE | 2902635 A1 * | 11/1979 |
| FR | 2 455 547 | 11/1980 |
| WO | WO 93/06008 | 4/1993 |
| WO | WO 96/11843 | 4/1996 |

* cited by examiner

*Primary Examiner*—Peter M. Poon
*Assistant Examiner*—Timothy D Collins
(74) *Attorney, Agent, or Firm*—Oblon, Spivak, McClelland, Maier & Neustadt, P.C.

(57) ABSTRACT

The carrier structure of the invention is used for carrying a turboprop and it is designed to be mounted beneath and/or in front of an airplane wing. In characteristic manner, the carrier structure comprises:
  a top portion comprising a front arch, a rear arch, and longitudinal beams;
  an upwardly-open removable bottom portion comprising at least two bottom arches and longerons;
  the bottom portion being demountably fixed to the top portion by centering and fixing devices, the bottom and top portions together defining a housing suitable for receiving said turboprop, and
  a suspension for carrying said turboprop.

15 Claims, 7 Drawing Sheets

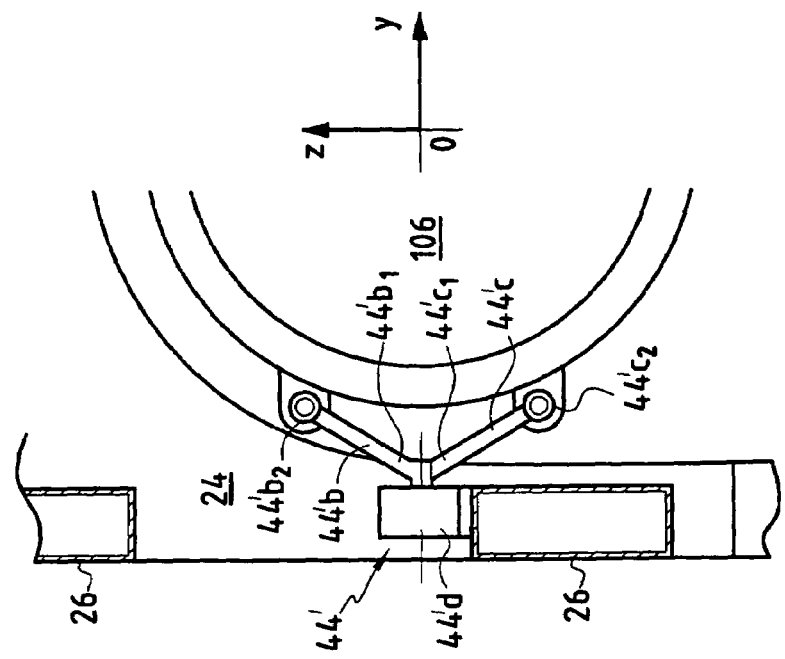
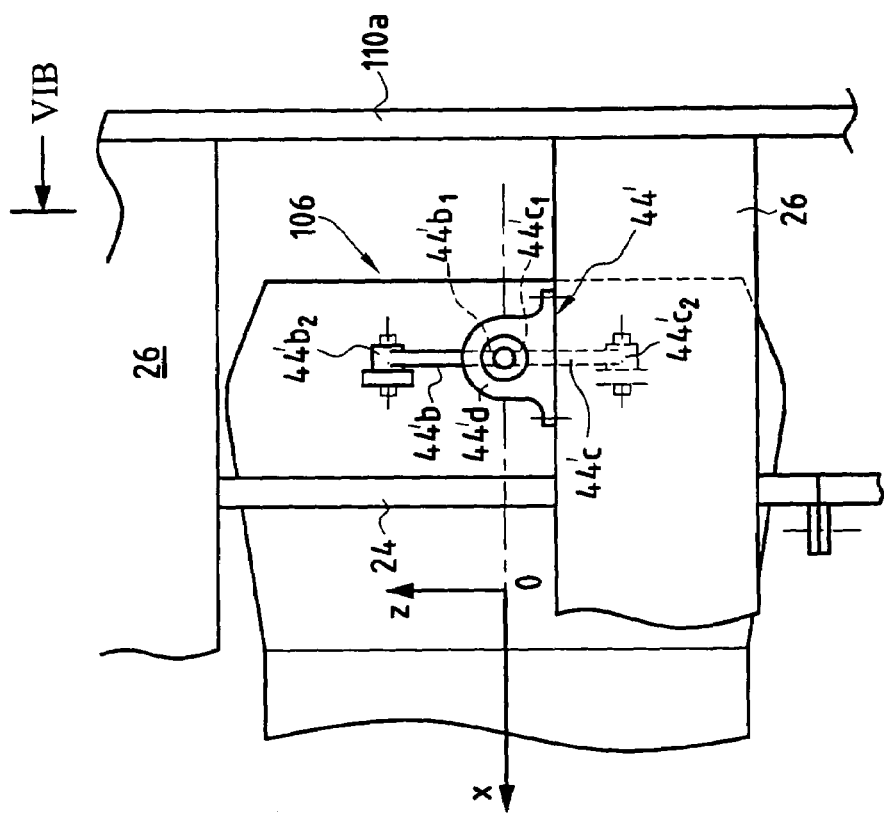
FIG.6B
FIG.6A

TURBOPROP CARRIER STRUCTURE AND AN ASSEMBLY INCLUDING SUCH A CARRIER STRUCTURE

The invention relates to a carrier structure for a turboprop, the turboprop having a front portion comprising a fan, a central portion, and a rear portion, and being designed to be mounted in a longitudinal direction beneath and/or in front of an airplane wing, said wing having a framework.

It should be understood that although the present invention is particularly adapted to a turboprop, i.e. to a jet engine whose turbine drives an external propeller, it may also be applied to other types of jet engine.

The present invention also relates to making an assembly comprising a carrier structure as mentioned above, an airplane wing to which said structure is fixed, and a turboprop.

BACKGROUND OF THE INVENTION

Such a carrier structure must naturally enable the engine to be supported both when at rest and when in operation. In particular, it is necessary for the carrier structure to withstand the thrust forces from the engine, which forces must also be properly transferred to the framework of the airplane, and in particular to the framework of the wing. It is also important that the carrier structure is not deformed by the mechanical forces to which it and the wing are subjected, such as aerodynamic resistance forces.

Conventionally, this type of carrier structure holds the engine and enables it to be inserted and withdrawn via the open front of the carrier structure.

Proposals have also been made to provide a carrier structure in the form of a right portion and a left portion: nevertheless, that solution is ill-suited when it comes to mounting and dismounting the engine.

Furthermore, in the solutions that have been proposed in the past, in order to dismount the engine, or even in order to gain access to certain members of the engine, it has often been necessary to decouple the carrier structure from the airplane wing, at least in part, thereby making said operation relatively lengthy to perform.

Document U.S. Pat. No. 4,266,741 describes a device for mounting a turbofan engine (bypass turbojet) disposed beneath the wing of an airplane, in which the engine is passed through the bottom of the support structure during mounting and dismounting. Nevertheless, that mounting device presents a certain number of drawbacks. In particular, no support structure is provided forming a structural assembly having strength and cohesion in a radial direction.

OBJECTS AND SUMMARY OF THE INVENTION

An object of the present invention is to provide a carrier structure enabling the various forces to which it is subjected to be withstood while also enabling the engine to be dismounted and remounted in a manner that is simple, reliable, and relatively quick. In particular, it is desired to provide a carrier structure that does not need to be fully dismounted in order to gain access to the engine during maintenance operations and/or in order to remove the engine.

To this end, according to the present invention, the carrier structure comprises:

a downwardly-open top portion for securely mounting to the framework of said wing and comprising a front arch from which said front portion of the turboprop is to be suspended, a rear arch, and longitudinal beams disposed at least between said front arch and said rear arch and suitable for extending as far as the framework of said wing, said longitudinal beams interconnecting said front arch and said rear arch and being designed to be secured to the framework of said wing;

a removable, upwardly-open bottom portion having at least two bottom arches together with longerons extending in the longitudinal direction and interconnecting said bottom arches;

said bottom portion being demountably secured to the top portion by centering and fixing means, said bottom and top portions together defining a housing suitable for receiving said turboprop; and a suspension for carrying said turboprop.

In this manner, it will be understood that the presence of a top portion and a bottom portion made by means of structural elements (arches, beams, longerons, . . . ), a carrier structure is obtained that presents good strength, for weight that is not excessive.

In addition, mounting and dismounting the bottom portion is made easier by using the centering and fixing means, thus making access to the housing and thus to the turboprop easier.

Preferably, said front arch and said rear arch of the top portion are each extended in a vertical plane by a respective one of the bottom arches: this solution favors structural cohesion that is radially symmetrical, since at the front arch and at the rear arch there is a rigid element of closed outline that is (approximately) circular in shape.

Preferably, said top portion further comprises at least one intermediate arch mounted on said longitudinal beams between said front arch and said rear arch, likewise in order to reinforce the rigidity of the top portion.

In another advantageous disposition, said top portion further comprises a top cowling assembly disposed on the outside going from said framework of said wing at least as far as said front arch, while leaving an opening for placing longitudinally in line with the fan of the turboprop.

Preferably, said top cowling assembly includes at least one hinged cover capable of being opened to give access to said housing containing said turboprop.

Similarly, and preferably, said bottom portion further comprises a bottom cowling assembly disposed on the outside going from said framework of said wing at least as far as said front arch, leaving an opening for placing longitudinally in line with the fan of the turboprop.

In a preferred disposition, said centering and fixing means comprise at least four centering and fixing assemblies disposed in a plane separating said top and bottom portions, each centering and fixing assembly comprising at least one centering pin and a corresponding hole, together with a locking device.

Such an arrangement makes it possible for mounting between the top and bottom portions to be quick and simple.

Preferably, said locking device comprises at least one screw co-operating with a corresponding thread and/or bore.

In another preferred disposition, said suspension comprises a front suspension mounted on said front arch of the top portion. Preferably, said front suspension comprises at least two fixing areas disposed symmetrically on said front arch of the top portion and connected to said front portion of the turboprop via respective tabs.

In a variant of this disposition, said suspension comprises a front suspension mounted on the bottom portion.

In another disposition, said suspension further comprises, on the longitudinal beams of the top portion, a rear suspension for flexibly retaining the rear portion of the turboprop.

Thus, the suspension also serves to hold the turboprop while also leaving it with clearance and limited ability to move relative to the carrier structure of the present invention.

Preferably, said rear suspension comprises two assemblies disposed symmetrically and transversely to the longitudinal direction, each assembly comprising first and second links together with an upright interconnecting at least two longitudinal beams of the top portion, the first and second links each having an outside end and an inside end, said inside end of the first link and said inside end of the second link being mounted on the rear portion of the turboprop one above the other, and said outside ends of the first and second links being connected to said upright.

In another solution, said rear suspension comprises two assemblies disposed symmetrically and transversely to the longitudinal direction, each assembly comprising first and second links and a pivot support connected to a longitudinal beam of the top portion, the first and second links each having an outside end and an inside end, said inside end of the first link and said inside end of the second link being mounted on the rear portion of the turboprop one above the other, and said outside ends of the first and second links being connected to at least one of the longitudinal beams of the top portion.

The present invention also provides an assembly comprising a structure as described above, an airplane wing to which said structure is fixed, and a turboprop disposed in said housing.

BRIEF DESCRIPTION OF THE DRAWINGS

Other advantages and characteristics of the invention appear on reading the following description made by way of example and with reference to the accompanying drawings, in which:

FIGS. 6A and 6B are diagrams showing a variant embodiment of the rear suspension.

MORE DETAILED DESCRIPTION

Figure 1:
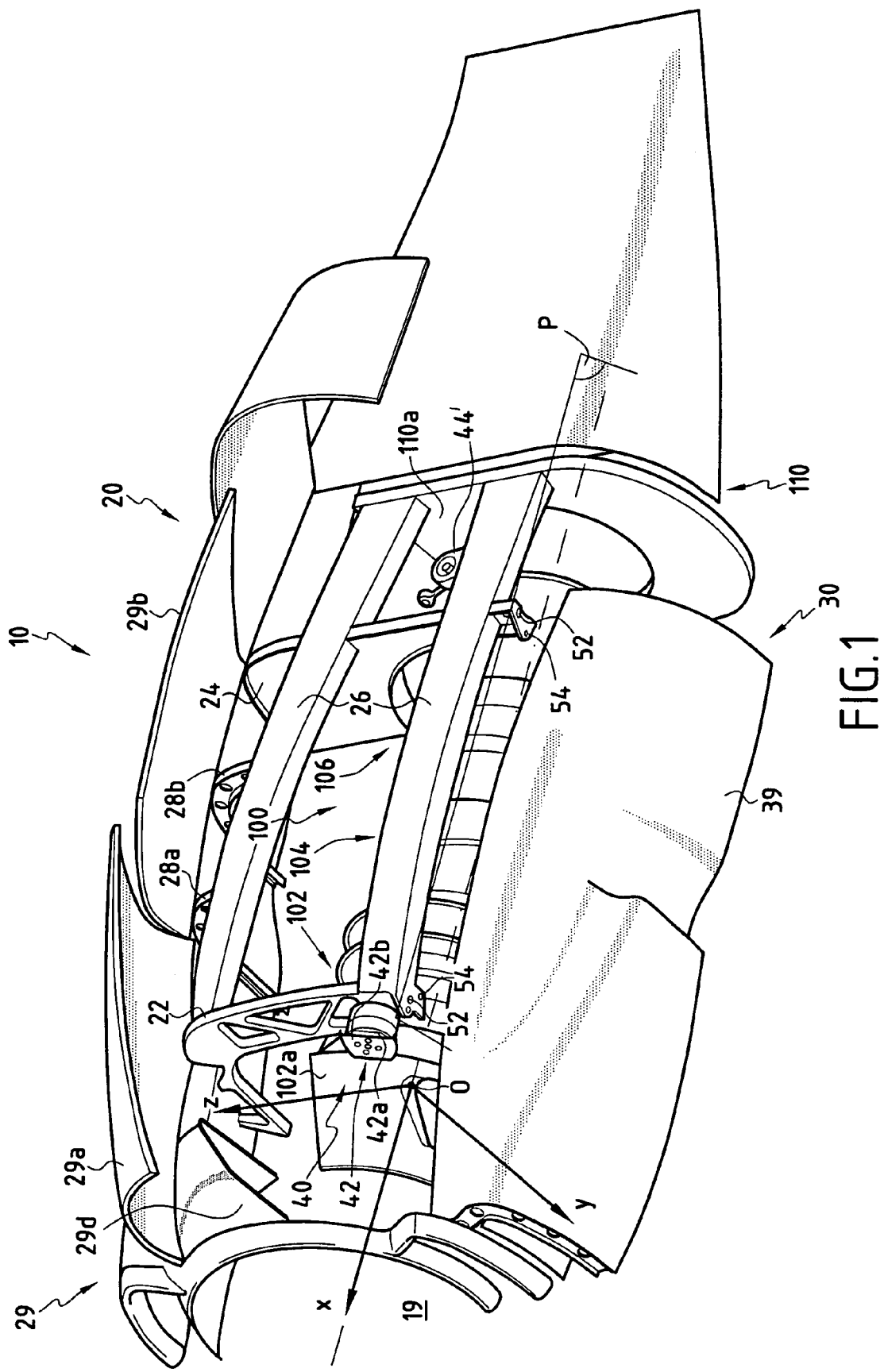
FIG. 1 is a partially-exploded perspective view seen from the side, in front, and beneath showing the outside of a side portion of a carrier structure of the present invention mounted under the wing of an airplane, and having a turboprop mounted thereon.

Reference is made initially to FIG. 1 in which the carrier structure 10 is shown in part as seen from the outside.

FIG. 1 also shows part of a turboprop 100 comprising a front portion 102, a central portion 104 and a rear portion 106. In conventional manner, the front portion 102 contains the fan 102a, the central portion 104 contains the compressor and the combustion chamber (not shown), and the rear portion 106 contains a turbine.

The way in which the turboprop 100 is mounted and dismounted on the carrier structure 10 is explained below after describing the various elements making up the carrier structure 10.

FIG. 1 also shows a portion of an airplane wing beneath which said load-carrier structure 10 is positioned.

More precisely, FIG. 1 shows a portion of the wing framework 110 in the form of a yoke 110a forming a support frame for the carrier structure 10.

The wing (not shown) extends in a generally transverse direction (Oy), while the carrier structure 10 for receiving the turboprop 100 extends in a longitudinal direction (Ox), the vertical direction being identified by (Oz).

In general, the carrier structure 10 comprises a set of structural beams forming a mechanical structure of great strength and great rigidity, while still giving access to various portions of the turboprop 100. Another quality of this carrier structure 10 is its weight, since the use of structural beams provides a better ratio of rigidity over weight.

As described below, this carrier structure 10 is also remarkable in that it makes it simple to mount and dismount the turboprop 100 from below.

Overall, the carrier structure 10 comprises a top portion 20, a bottom portion 30, and a suspension 40 enabling the turboprop 100 to be connected to the carrier structure 10.

The top portion 20 of the carrier structure 10 is constituted by a set of structural beams securely mounted to the framework 110 of the airplane wing.

The top portion 20 of the carrier structure 10 comprises a plurality of downwardly-open arches disposed from front to rear along the longitudinal direction (Ox). In particular, the top portion 20 comprises a front arch 22 and a rear arch 24 which are generally in the form of upside-down U-shapes extending from the top of the top portion 20 to the bottom of the top portion 20 where a substantially horizontal mounting plane P is defined (see FIGS. 1, 5, and 7).

The top portion 20 also has four longitudinal beams 26 (only two of them being visible in FIG. 1). These longitudinal beams 26 extend in the longitudinal direction (Ox) from the front arch 22 to the yoke 110a to which they are fixed, passing via the rear arch 24.

These longitudinal beams 26 are situated in pairs one above the other, on either side of the turboprop 100, thus forming two top longitudinal beams 26 and two bottom longitudinal beams 26.

In addition, amongst the four longitudinal beams 26, there is left-right symmetry (which applies overall to the entire carrier structure 10), i.e. on either side of the vertical plane (xOz) of the top and bottom portions 10 and 30 of the carrier structure 10. Two longitudinal beams 26 (one top longitudinal beam and one bottom longitudinal beam) are situated on the right of the turboprop 100 and two longitudinal beams 26 (one top longitudinal beam and one bottom longitudinal beam) are situated on the left of the turboprop 100.

As can be seen in FIG. 1, the two top longitudinal beams 26 are fixed securely to the top ends of the limbs of the two U-shapes formed by the front and rear arches 22 and 24. Likewise, the two bottom longitudinal beams 26 are mounted securely to the bottom ends of the limbs of the two U-shapes formed by the front and rear arches 22 and 24 (i.e. to the free ends of the front and rear arches 22 and 24).

The rear arch 24 situated between the front arch 22 and the yoke 110a is likewise fixed to the four longitudinal beams 26 just like the front arch 22.

In order to reinforce the rigidity of the entire top portion 20, two downwardly-open intermediate arches 28a and 28b forming respective stiffeners are situated between the front arch 22 and the rear arch 24.

As can be seen in FIG. 1, these upside-down U-shaped intermediate arches 28a and 28b extend from the top of the top portion 20 down to the two top longitudinal beams 26. Naturally, provision could also be made for the ends of these intermediate arches 28a and 28b to extend down to the two bottom longitudinal beams 26 (option not shown).

In order to finish off and cover the top portion 20, it further comprises a top cowling assembly 29 comprising both fixed portions and moving portions.

The top cowling assembly 29 completely surrounds the top portion 20 and thus the top of the turboprop 100, while nevertheless leaving a circular opening 19 longitudinally in line with the opening of the fan 102a.

In particular, the moving parts of the two cowling assembly 29 comprise a first hinged cover 29a situated at the front (the left-hand ends of FIGS. 1, 2, and 3), and a second hinged cover 29b situated at the rear, giving access to the various portions of the turboprop 100.

Figure 2:
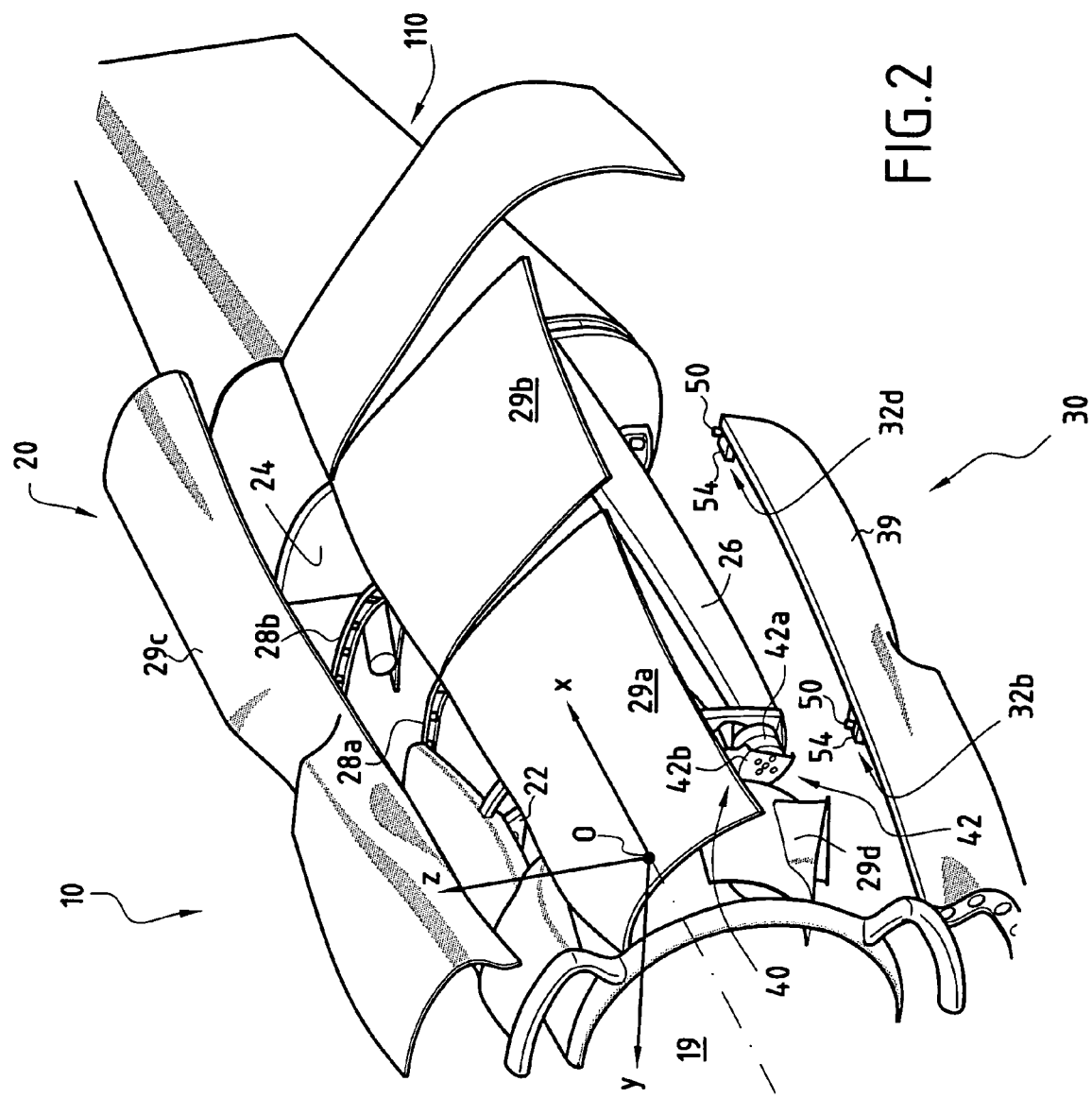
FIG. 2 is a perspective view of the outside from the side, in front, and above, similar to FIG. 1 but without the turboprop.
Figure 3:
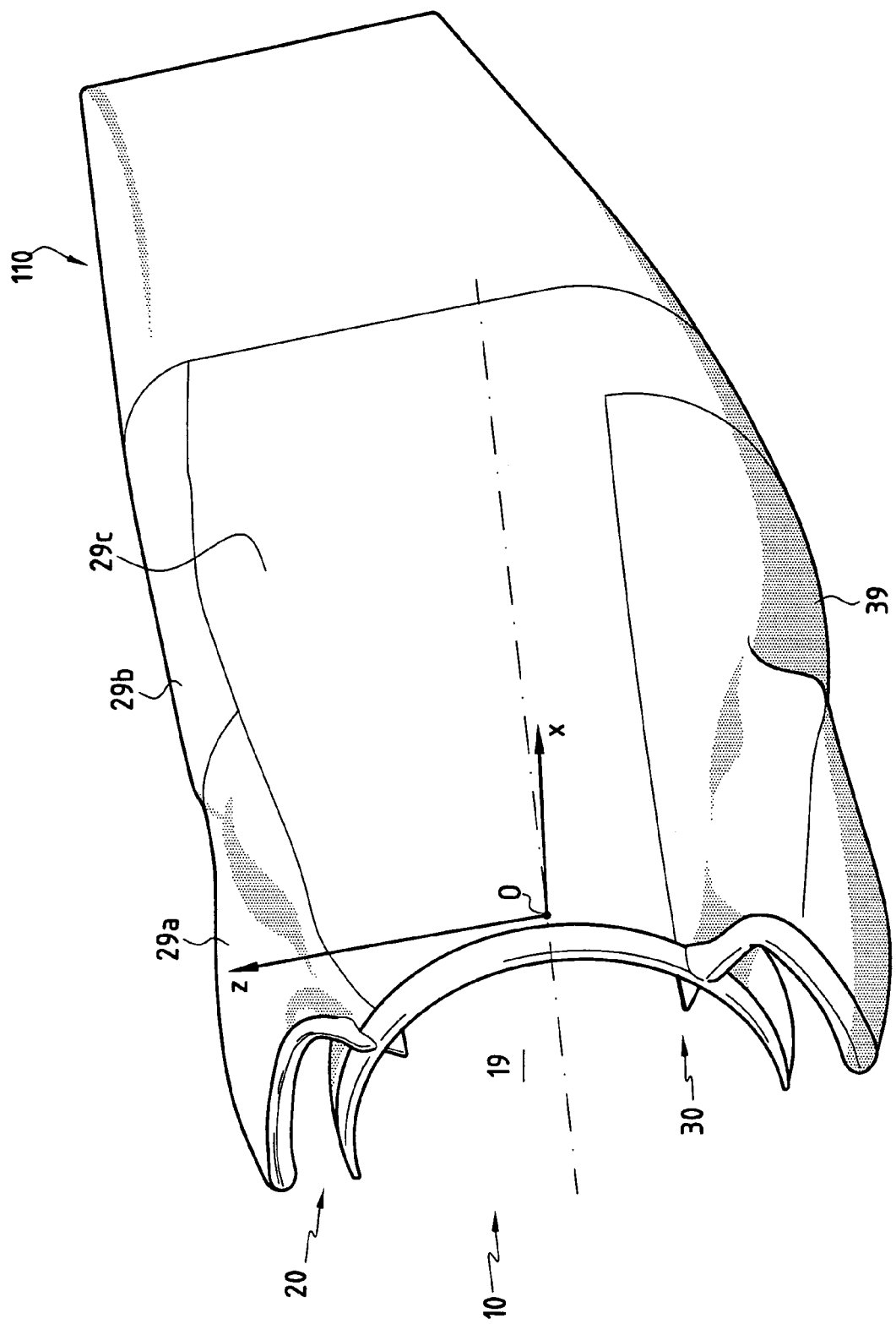
FIG. 3 is a view similar to FIG. 2 with the covers of the top and bottom cowling assemblies closed, and showing a variant embodiment for the top cowling assembly.

The fixed parts of the top cowling assembly 29 comprise in particular a fixed cover 29c that is visible in FIGS. 2 and 3, and that extends longitudinally over practically the entire length of the carrier structure 10, beside the first and second hinged covers 29a and 29b.

In a first variant shown in FIGS. 1 and 2, when the carrier structure 10 is observed from the opening 19, the first and second hinged covers 29a and 29b are situated to the right of the fixed cover 29c.

In a second variant shown in FIG. 3, when the carrier structure 10 is observed from the opening 19, the first and second hinged covers 29a and 29b are situated to the left of the fixed cover 29c.

It can be observed that the top cowling assembly 29 extends outside the structural beams 22, 24, 26, 28a, and 28b of the top portion 20 from a zone situated in front of the fan 102a of the turboprop 100 to a zone situated behind the rear end 106 of the turboprop 100, and in particular extending as far as the yoke 110a; the framework 110 of the wing is itself provided with its own covering.

As can be seen in FIGS. 1 and 2, the hinged cover 29a situated at the front of the top portion 20 and the hinged cover 29b situated at the rear of the top portion 20 are made in the form of respective panels hinged on a longitudinally-extending hinge enabling the covers to pivot between a closed position and an open position.

Likewise, another portion of the top cowling assembly 29 can be seen in FIGS. 1 and 2 comprising a cover 29d situated adjacent to the opening 19 and shaped to facilitate the entry of air going towards the fan 102a.

As can be seen in FIGS. 1 and 2, the bottom portion 30 of the carrier structure 10 is upwardly open so as to co-operate with the top portion 20 to form a housing suitable for receiving and securing the turboprop 100, surrounding the turboprop completely.

According to another feature of the invention, the bottom portion 30 is removable since it is demountably connected to the top portion 20.

The bottom portion 30 comprises in particular four bottom arches 32a, 32b, 32c, and 32d in the form of upwardly-open U-shapes situated one behind the other along the longitudinal axis (Ox), together with longerons 34, preferably two longerons.

Figure 4:
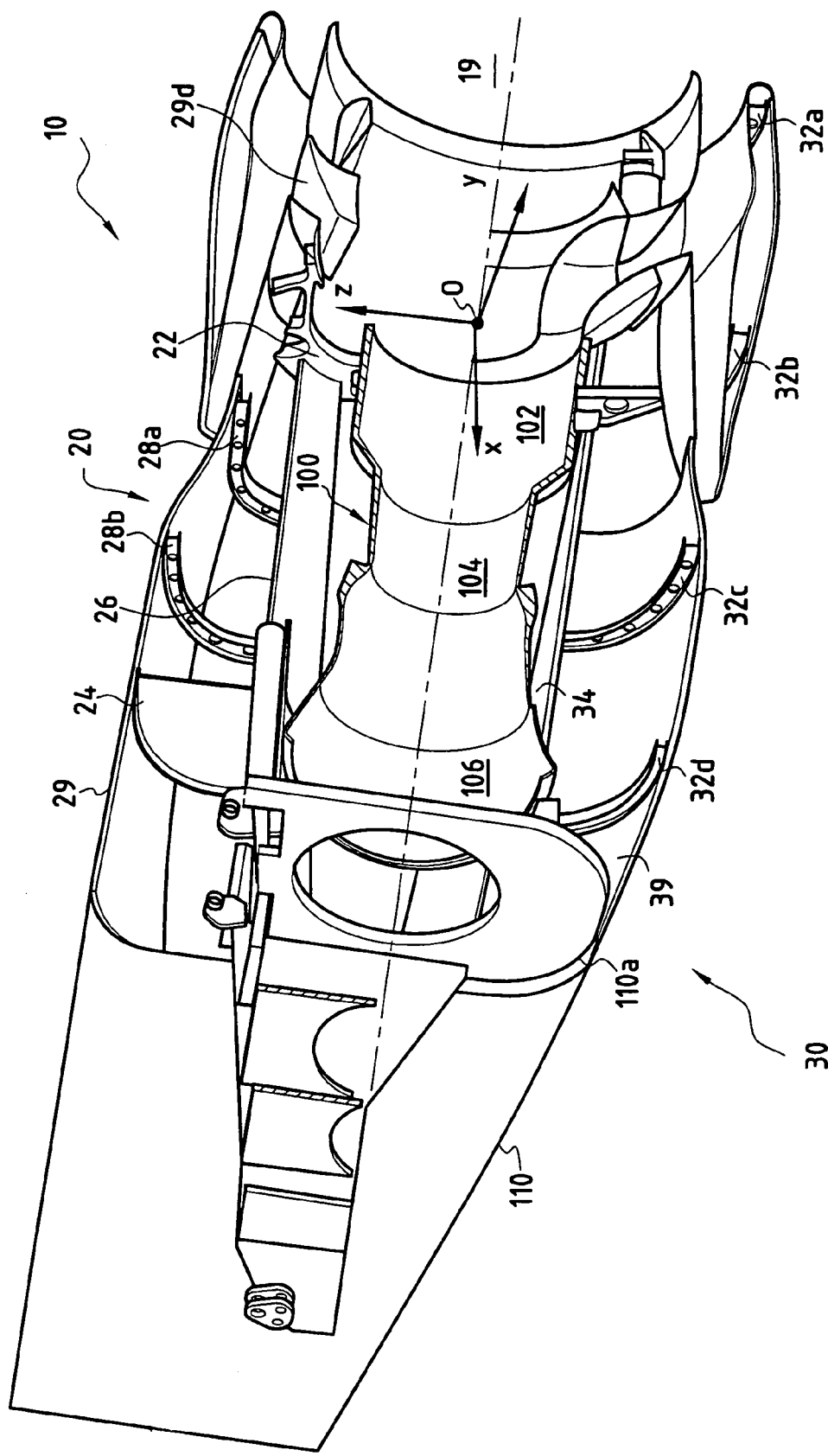
FIG. 4 is a perspective view of the inside of the carrier structure of the present invention seen from the side and the rear, and in the configuration of FIG. 3.

As can be seen in FIG. 4, the bottom arch 32d situated furthest to the left (to the rear relative to the opening 19 which is at the front) lies in the same vertical plane as the rear arch 24 of the top portion 20, while the bottom arch 32a that is situated furthest to the right (to the front) constitutes the structural element situated furthest forward at the opening 19, in front of the plane of the front arch 22 of the top portion 20.

In order to reinforce the mechanical cohesion of the carrier structure 10 as much as possible, and as can be seen in FIG. 4, there are two other bottom arches 32b and 32c situated to the left of (behind) the bottom arch 32a, and to the right of (in front of) the bottom arch 32d which is situated in the same vertical plane as the rear arch 24 of the top portion 20.

In remarkable manner, the bottom arch 32b is situated in the same vertical plane as the front arch 22 of the top portion 20.

The two above-mentioned planes (i.e. the planes of the front arch 22 and of the rear arch 24) of the top portion 20 thus define vertical mounting planes for releasably connecting the bottom portion 30 to the top portion 20.

More precisely, as can be seen in FIG. 2, the top ends of the bottom arches 32b and 32d are fitted with respective spigots or pins 50 for co-operating with corresponding holes 52 situated at the bottom ends of the front and rear arches 22 and 24 (see FIG. 1). In addition, each of the ends of the front arch 22, the rear arch 24, and the bottom arches 32b and 32d is fitted with two bores 54 (see FIG. 1).

The two pairs of bores 54 of the two bottom ends (respectively right and left) of the front arch 22 are designed to be positioned in register with the two pairs of bores of the top ends (respectively right and left) of the bottom arch 32b.

Similarly, the two pairs of bores 54 of the two bottom ends (respectively right and left) of the rear arch 24 of the top portion 20 are designed to be placed facing and in correspondence with the two pairs of bores 54 of the top ends (respectively right and left) of the bottom arch 32d along the mounting plane P.

The mounting plane P is horizontal or substantially horizontal and it coincides with the horizontal diameter of the engine 100, or else this plane P is relatively close to but beneath the horizontal diameter of the engine 100.

More precisely, the section of the front and rear arches 22 and 24 extends over an angle at the center lying in the range 180° to 240°, and preferably equal to about 210°.

The above-described arrangement for the pairs of bores 54 ensures that the bottom portion 30 is secured to the top portion 20 by means of four pairs of screws (not shown) which are received respectively in the above-mentioned facing pairs of bores 54, and which can be seen in FIGS. 1 and 2.

It will be understood that the pins 50 centered on the bottom portion 30 relative to the top portion 20 by means of the holes 52, and also serve to transfer torque and forces between the bottom portion 30 and the top portion 20.

The bottom portion 30 further comprises a bottom cowling assembly 39 constituted in this case by a fixed cover. It should be understood that it is also possible to envisage making this bottom cowling assembly 39 as a plurality of portions with one or more hinged covers, as described above with reference to the top portion 20.

The fixing and retention of the turboprop 100 to the carrier structure 10 are described below with reference to FIGS. 1, 2, and 5 to 7.

In particular, this fixing is performed by means of a suspension 40 comprising a front suspension 42 and a rear suspension 44.

Figure 5:
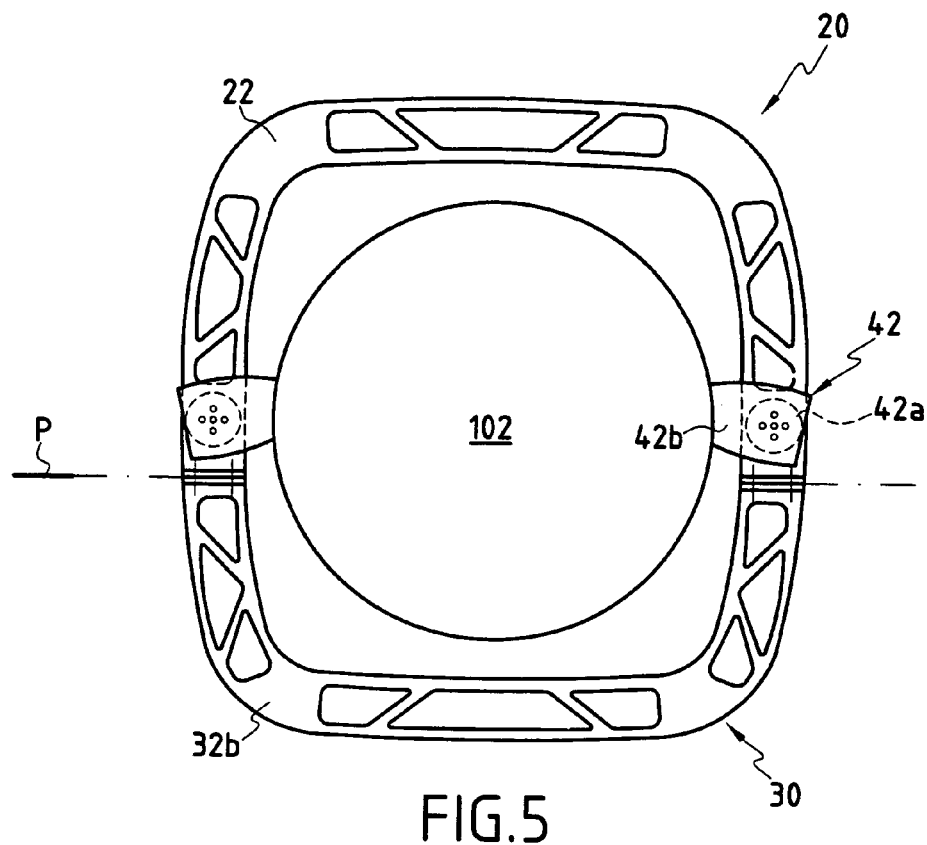
FIG. 5 is a diagrammatic view of the front suspension.

The front suspension 42 is shown diagrammatically in FIG. 5: the turboprop 100 is rigidly mounted in the front arch 22 of the top portion 20 by means of two fixing areas or blocks 42a each having a tab 42b mounted thereon, the tab in turn being connected to the front portion 102 of the turboprop 100. This front suspension 42 comprising the assembly made up of two fixing areas 42 and two tabs 42b constitutes a rigid assembly which holds the turboprop 100, in particular its front portion 102 in the housing formed by the carrier structure 10.

It should be understood that more than two fixing areas 42a could be provided (embodiment not shown); preferably an even number of fixing areas 42a are provided so as to conserve right-left symmetry.

Figure 6:
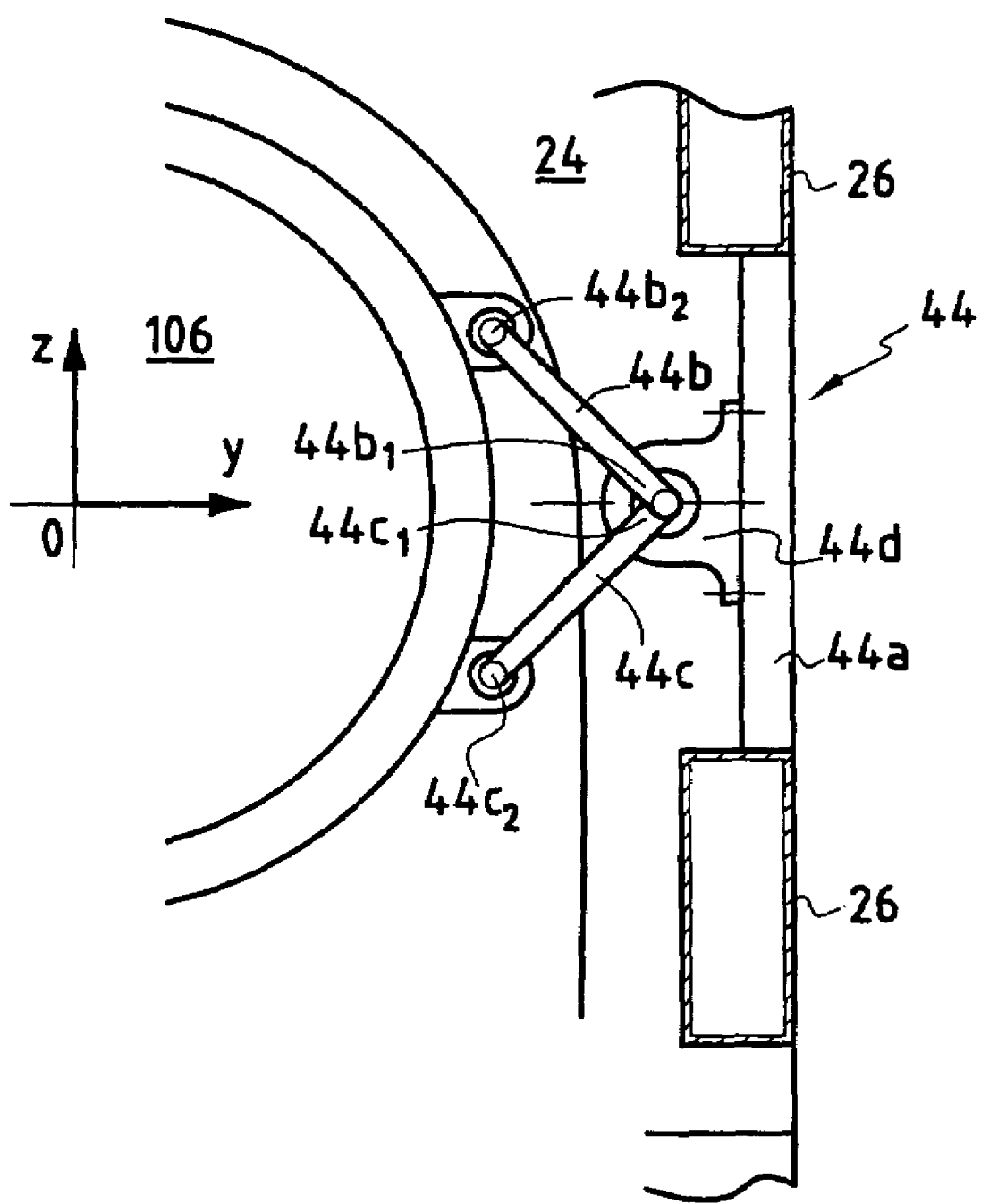
FIG. 6 is a diagrammatic view of the rear suspension.

The rear suspension 44 shown diagrammatically in FIG. 6 comprises on the right and on the left of the rear portion 106 of the turboprop 100, respective assemblies each comprising an upright 44a interconnecting the two longitudinal beams 26, a first link 44b (or slave connecting rod) and a second link 44c, together with a pivot support 44d mounted on the upright 44a.

In particular, the first link 44b is situated above the second link 44c, these two links 44b and 44c each having an outside end 44b₁ and 44c₁ which is pivotally mounted on the pivot support 44d, while the inside ends 44b₂ and 44c₂ of the first and second links 44b and 44c are connected elastically to the rear portion 106 of the turboprop, one above the other.

In another solution, the rear suspension 44' is made using a variant configuration as shown in FIGS. 6A and 6B which are respectively a side view and a half-section on direction VIB—VIB of FIG. 6A.

In this configuration, the rear suspension 44' is likewise symmetrical about the longitudinal vertical plane (xOz) so as to comply with right-left symmetry. On the right and on the left the rear suspension 44' is formed by a respective assembly comprising a first link 44'b (or slave connecting rod), a second link 44'c, and a pivot support 44'd mounted directly on the top face of the bottom longitudinal beam 46 (see FIGS. 6B and 1). Provision can also be made (configuration not shown) to mount the pivot link support 44'd on the bottom face of the top longitudinal beam 26, instead.

In the present case, and more precisely, the first link 44'b is situated above the second link 44'c, each of the two links 44'b, 44'c having a respective outside end 44'b₁ and 44'b₂ which is pivotally mounted to the pivot support 44'd, whereas the inside ends 44'b₂ and 44'c₂ of the first and second links 44'b, 44'c are fixed via respective elastic connections to the rear portion 106 of the turboprop, one above the other, as can be seen in FIG. 6B.

It will thus be understood that the front suspension 42 is rigid, while the rear suspension 44 is flexible, because of the above-mentioned elastic connection.

In order to install or remove the turboprop 100, hoists are placed above the top portion 20. Thereafter, the bottom portion 30 is separated from the remainder of the carrier structure 10 by uncoupling the eight screws housed in the bores 54 and by removing the bottom portion 30.

Thereafter, it is necessary to separate the turboprop 100 from the front suspension 42 (tab 42b) and from the rear suspension 44 (links 44b and 44c) before being able to release the turboprop.

Figure 7:
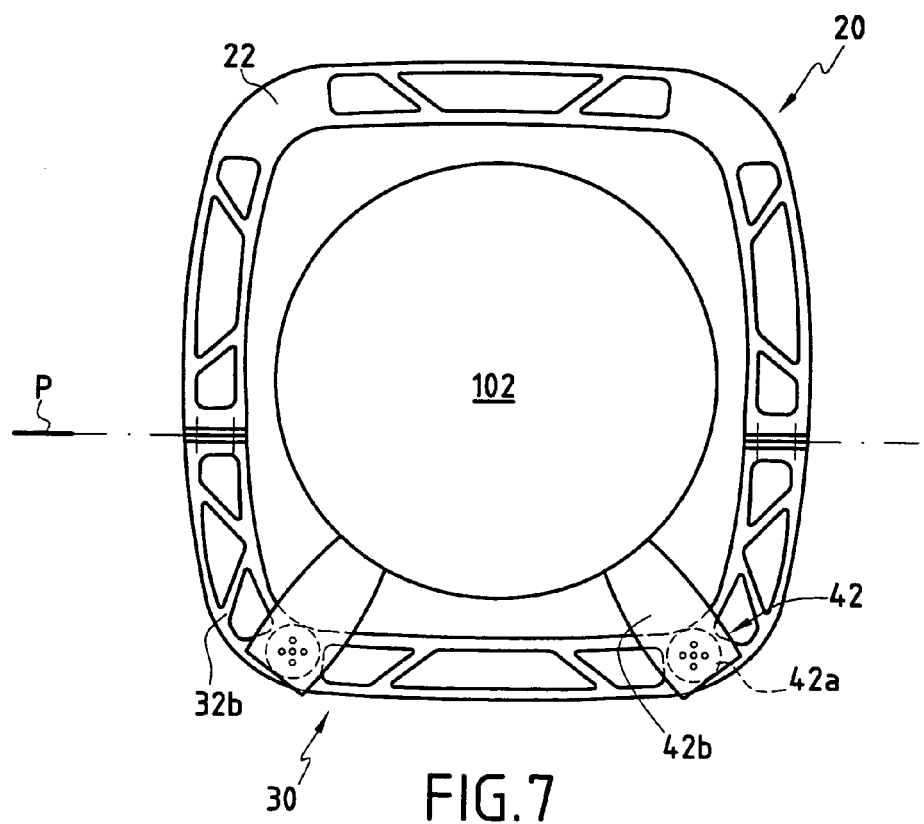
FIG. 7 is a diagram showing a variant embodiment of the front suspension.

In another and particularly advantageous solution in accordance with the present invention, the front suspension 42 is made using the variant shown in FIG. 7.

In this case, the fixing tabs 42a are mounted on the bottom arc 32b of the bottom portion 30. In this way, after uncoupling the eight screws interconnecting the top and bottom portions 20 and 30 in the mounting plane P, and after taking the rear suspension 44 apart, the turboprop 100 is taken away together with the bottom portion 30 which then acts as a transfer cradle for the engine.

It will be understood that this cradle solution is also advantageous in that it makes it easier to center the tabs 42b on the fixing areas 42a, since this operation is performed while the bottom portion 30 is no longer connected to the top portion 20.

What is claimed is:

1. A carrier structure for a turboprop, the turboprop having a front portion comprising a fan, a central portion, and a rear portion, and being designed to be mounted in a longitudinal direction beneath and/or in front of an airplane wing, said wing having a framework, the carrier structure comprising:
  a downwardly-open top portion for securely mounting to the framework of said wing and comprising a front arch from which said front portion of the turboprop is to be suspended, a rear arch, and longitudinal beams disposed at least between said front arch and said rear arch and suitable for extending as far as the framework of said wing, said longitudinal beams interconnecting said front arch and said rear arch and being designed to be secured to the framework of said wing;
  a removable, upwardly-open bottom portion having at least two bottom arches together with longerons extending in the longitudinal direction and interconnecting said bottom arches;
  said bottom portion being demountably secured to the top portion by centering and fixing means, said bottom and top portions together defining a housing suitable for receiving said turboprop; and
  a suspension for carrying said turboprop.

2. A carrier structure according to claim 1, wherein said front arch and said rear arch of the top portion are each extended in a vertical plane by a respective one of the bottom arches.

3. A carrier structure according to claim 1, wherein said top portion further comprises at least one intermediate arch mounted on said longitudinal beams between said front arch and said rear arch.

4. A carrier structure according to claim 1, wherein said top portion further comprises a top cowling assembly disposed on the outside going from said framework of said wing at least as far as said front arch, while leaving an opening for placing longitudinally in line with the fan of the turboprop.

5. A carrier structure according to claim 4, wherein said top cowling assembly includes at least one hinged cover capable of being opened to give access to said housing containing said turboprop.

6. A carrier structure according to claim 1, wherein said bottom portion further comprises a bottom cowling assembly disposed on the outside going from said framework of said wing at least as far as said front arch, leaving an opening for placing longitudinally in line with the fan of the turboprop.

7. A carrier structure according to claim 1, wherein said centering and fixing means comprise at least four centering and fixing assemblies disposed in a plane separating said top and bottom portions, each centering and fixing assembly comprising at least one centering pin and a corresponding hole, together with a locking device.

8. A carrier structure according to claim 7, wherein said locking device comprises at least one screw co-operating with a corresponding thread and/or bore.

9. A carrier structure according to claim 1, wherein said suspension comprises a front suspension mounted on said front arch of the top portion.

10. A carrier structure according to claim 9, wherein said front suspension comprises at least two fixing areas disposed symmetrically on said front arch of the top portion and connected to said front portion of the turboprop via respective tabs.

11. A carrier structure according to claim 1, wherein said suspension comprises a front suspension mounted on the bottom portion.

12. A carrier structure according to claim 1, wherein said suspension further comprises, on the longitudinal beams of the top portion, a rear suspension for flexibly retaining the rear portion of the turboprop.

13. A carrier structure according to claim 12, wherein said rear suspension comprises two assemblies disposed symmetrically and transversely to the longitudinal direction, each assembly comprising first and second links together with an upright interconnecting at least two longitudinal beams of the top portion, the first and second links each having an outside end, and an inside end, said inside end of the first link and said inside end of the second link being mounted on the rear portion of the turboprop one above the other, and said outside ends of the first and second links being connected to said upright.

14. A carrier structure according to claim 12, wherein said rear suspension comprises two assemblies disposed symmetrically and transversely to the longitudinal direction, each assembly comprising first and second links and a pivot support connected to a longitudinal beam of the top portion, the first and second links each having an outside end and an inside end, said inside end of the first link and said inside end of the second link being mounted on the rear portion of the turboprop one above the other, and said outside ends of the first and second links being connected to at least one of the longitudinal beams of the top portion.

15. An assembly comprising a structure according to claim 1, an airplane wing to which said structure is fixed, and a turboprop disposed in said housing.

* * * * *